W. A. SMITH.
HAY LOADER.
APPLICATION FILED JUNE 1, 1910.
1,047,715.
Patented Dec. 17, 1912.
4 SHEETS—SHEET 2.
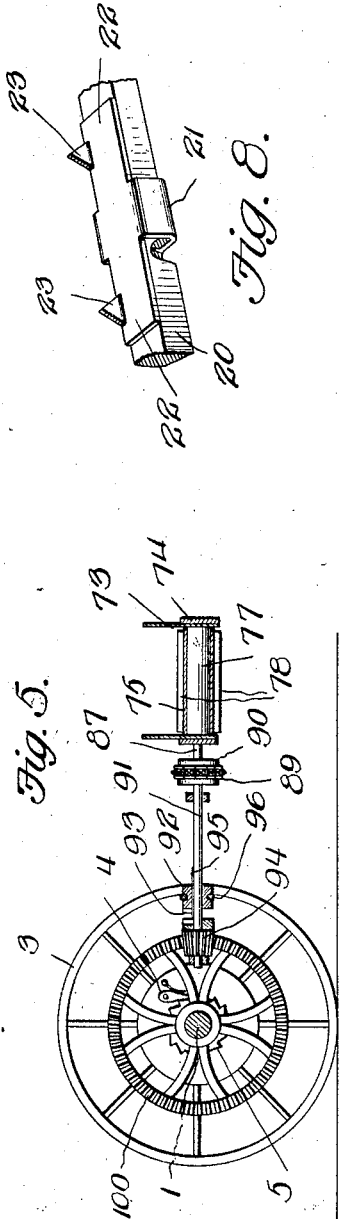
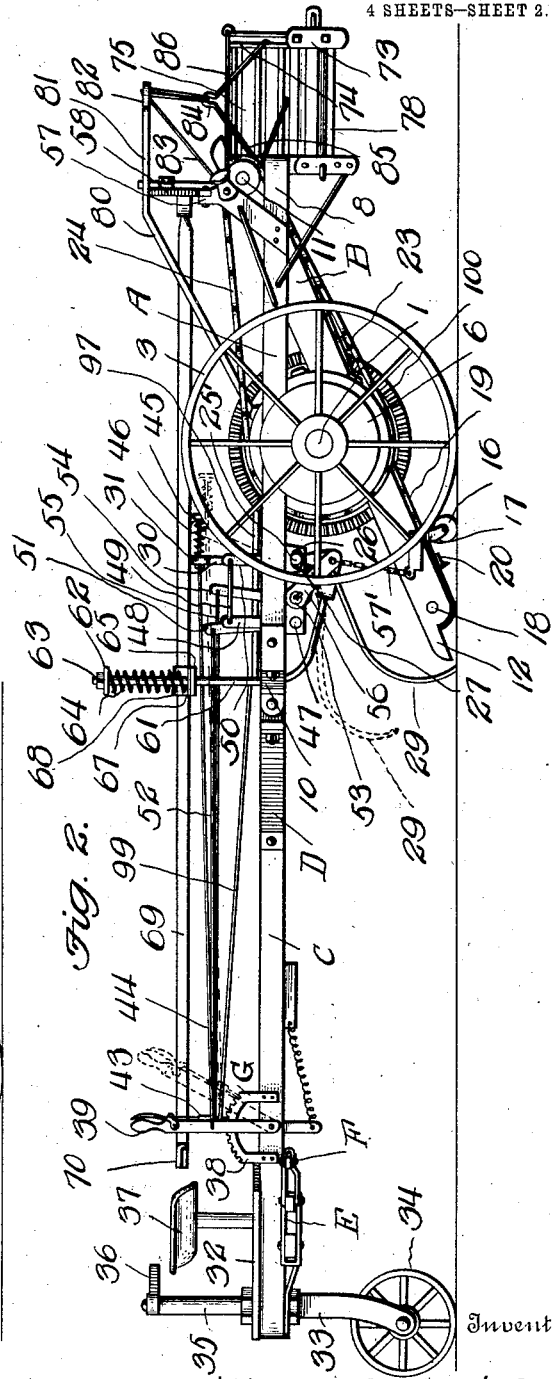
Witnesses
C. C. Richardson.
Wm Ragger
Inventor
Willard A. Smith,
By Victor J. Evans
Attorney W. A. SMITH.
HAY LOADER.
APPLICATION FILED JUNE 1, 1910.
1,047,715.
Patented Dec. 17, 1912.
4 SHEETS—SHEET 3.
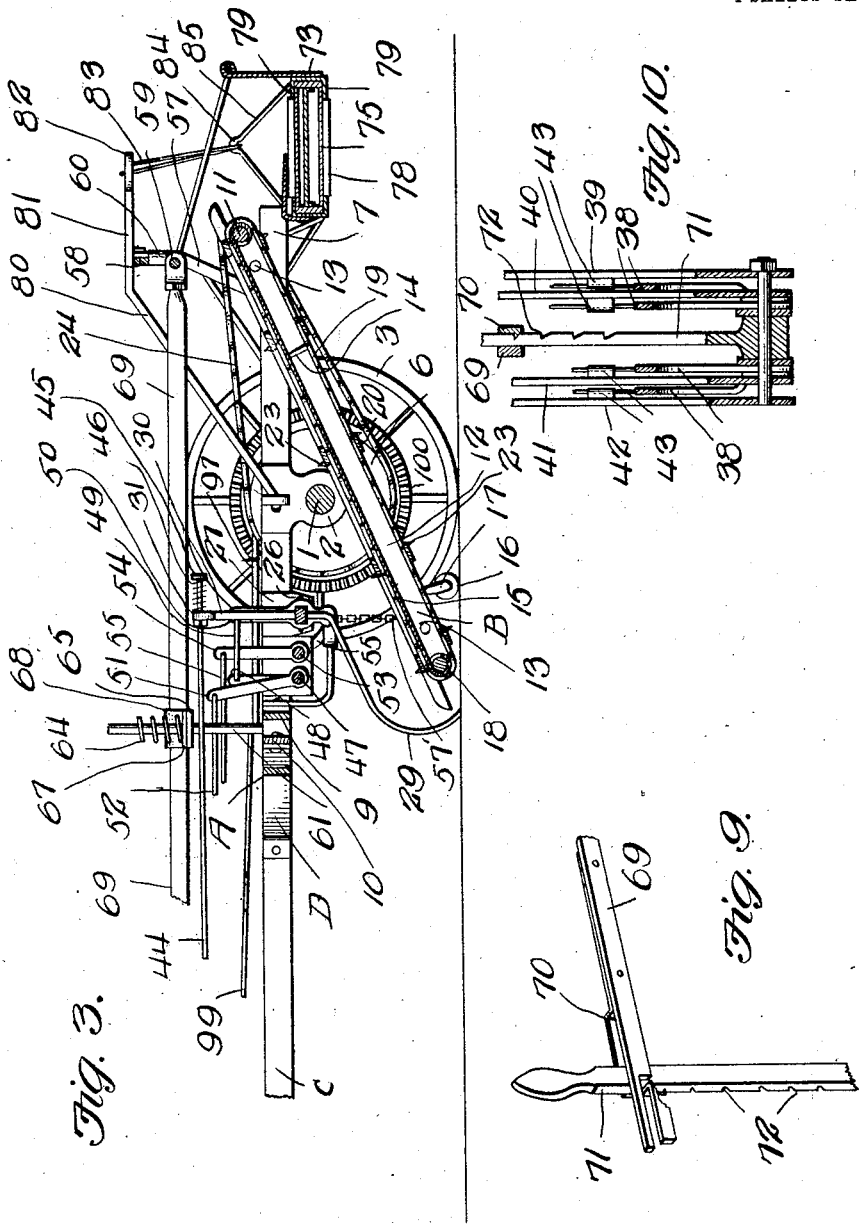
Witnesses
C. C. Richardson
Wm Bagger
Inventor
Willard A. Smith,
By Victor J. Evans
Attorney

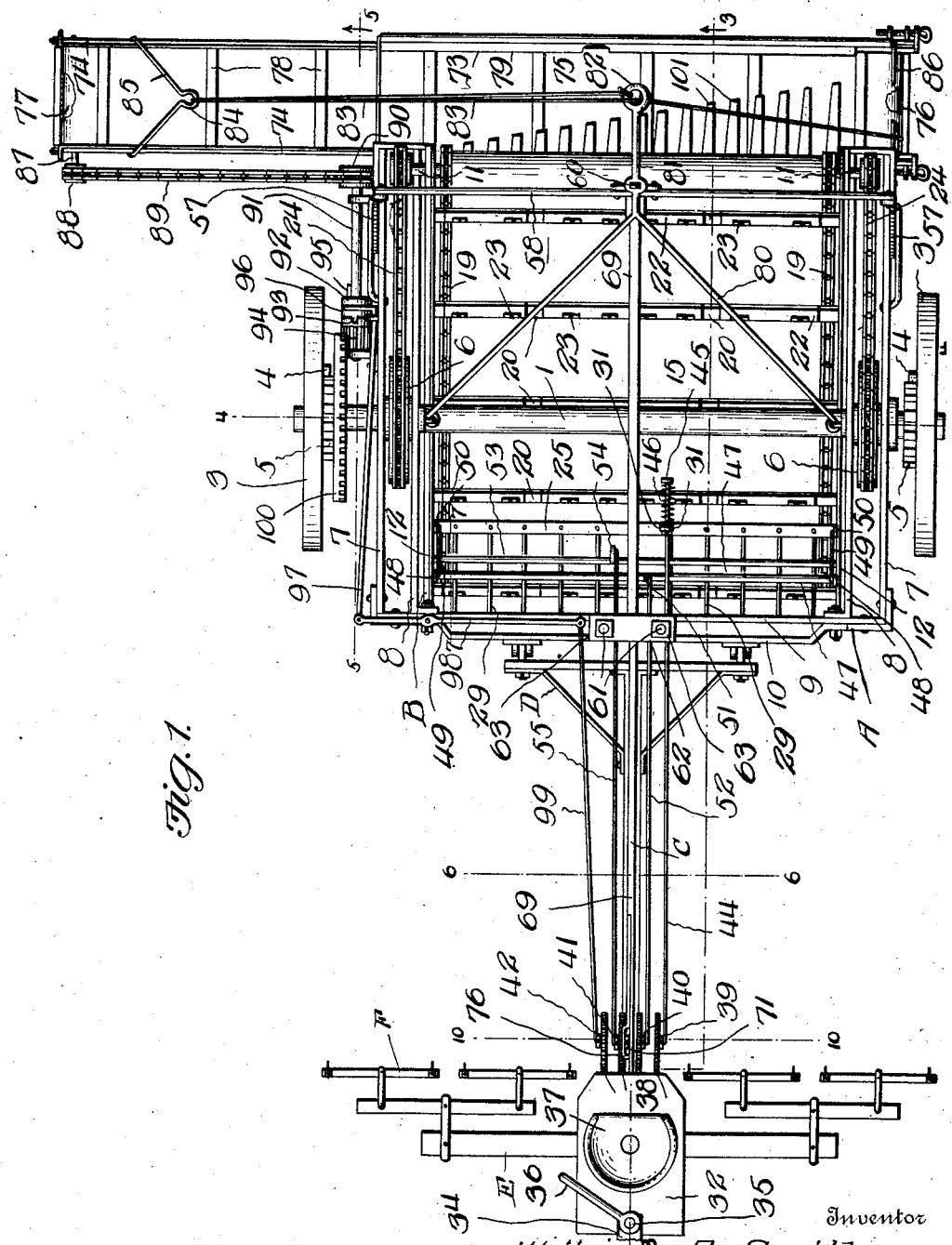

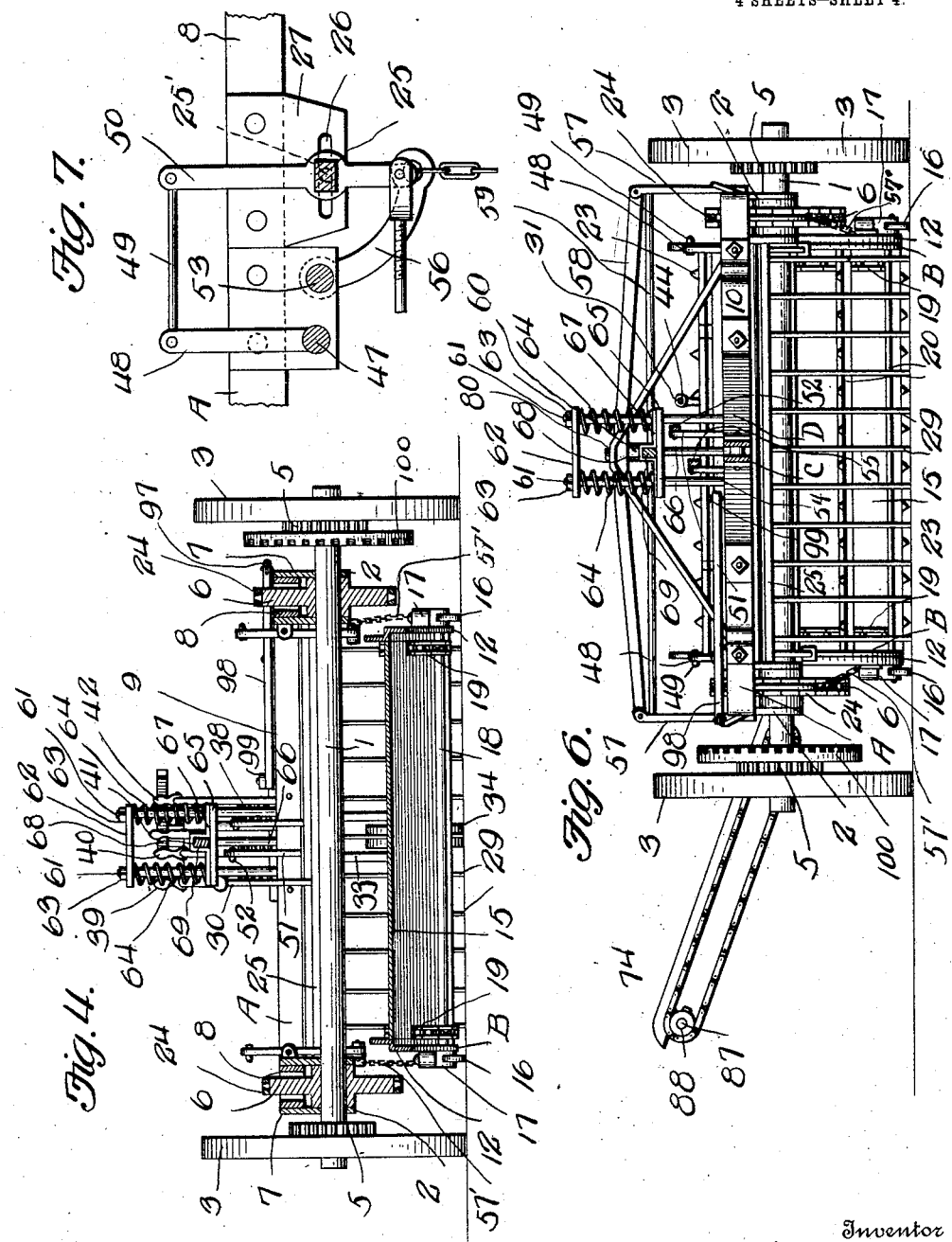

UNITED STATES PATENT OFFICE.

WILLARD A. SMITH, OF LIKELY, CALIFORNIA.

HAY-LOADER.

1,047,715.   Specification of Letters Patent.   Patented Dec. 17, 1912.

Application filed June 1, 1910. Serial No. 564,433.

*To all whom it may concern:*

Be it known that I, WILLARD A. SMITH, a native-born citizen of the United States of America, residing at Likely, in the county of Modoc and State of California, have invented new and useful Improvements in Hay-Loaders, of which the following is a specification.

This invention relates to hay loaders, and it has particular reference to that class of hay loaders which are equipped with means for gathering the hay as the machine is being propelled over the field and for elevating the hay and transporting the same to a receptacle such as a wagon or hay rack driven alongside of the gathering and loading machine.

The invention has for its object to simplify and improve the construction and operation of the class of machines generally outlined above, and with these and other ends in view, which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the invention may be resorted to when desired.

In the drawings,—Figure 1 is a top plan view of a machine constructed in accordance with the invention. Fig. 2 is a side elevation of the same. Fig. 3 is a longitudinal sectional view taken on the line 3—3 in Fig. 1. Fig. 4 is a vertical transverse sectional view taken on the line 4—4 in Fig. 1. Fig. 5 is a longitudinal sectional detail view taken on the line 5—5 in Fig. 1. Fig. 6 is a transverse sectional view taken on the line 6—6 in Fig. 1. Fig. 7 is a sectional detail view, enlarged, taken on the line 7—7 in Fig. 1. Fig. 8 is a perspective detail view of a portion of one of the slats used in the construction of the endless carrier for elevating the hay. Fig. 9 is a perspective detail view of a portion of the device for tilting the frame of the machine. Fig. 10 is a sectional detail view taken on the line 10—10 in Fig. 1.

Corresponding parts in the several figures are denoted by like characters of reference.

The main carrying frame A of the improved machine is supported on an axle 1 which is mounted for rotation in suitable bearings 2, said axle being provided with transporting wheels 3 mounted for rotation and having pawls 4 engaging ratchet wheels 5 that are fixed upon the axle so that the latter will be rotated when the machine is traveling in a forward direction and remain stationary when the machine is backed. The axle is equipped with sprocket wheels 6 from which motion is transmitted to various driven parts of the machine, as will be hereinafter described. The frame includes at each side a pair of suitably spaced side members 7 and 8, as best seen in Figs. 1 and 4, between which the sprocket wheels 6 are accommodated. The pairs of side members 7, 8 are connected adjacent to their rear ends by suitably spaced rear cross bars 9 and 10, as clearly seen in Fig. 1.

A shaft 11, which is suitably mounted for rotation adjacent to the front end of the main frame, serves to support the carrier frame B, the latter being composed of side members 12 which are suitably connected and spaced apart by cross bars 13 and braces 14, said frame including also a table 15 serving to support the hay or material that is to be elevated. The frame B is pivotally supported upon the shaft 11 so that the rear end of said frame may be raised or lowered at will. Normally, however, the lower end of the frame B is carried by wheels or casters 16 which are supported for rotation by means of brackets 17 connected with the frame. A shaft 18 is supported for rotation at the lower end of the frame B, and said shaft is connected with the shaft 11 by chains 19 which are connected at intervals by slats 20, each of which, as shown in detail in Fig. 8, is provided with clamps 21 having laterally extending wings 22 provided with outwardly extending spurs 23 for the purpose of engaging the hay that is to be elevated and assisting in carrying it over the inclined table or platform 15. The shaft 11 is driven by means of chains 24 from the sprocket wheels 6 upon the axle, it being understood that said shaft 11 as well as the carrier shaft 18 is provided with suitable sprocket pinions for the transmission chains and the carrier chains.

The rake or gathering device comprises a cross bar or head 25 which is slidably supported in longitudinal slots 26 in brackets 27 upon the frame bars 8, as will be best seen in Fig. 7. The rake head 25 is equipped with suitably curved teeth 29 which extend in rear of the lower end of the carrier frame B so that as the machine progresses over the ground the hay will be gathered by said teeth and swept by the toothed slats of the carrier in an upward and forward direction over the inclined table or platform 15 of the carrier. The rake head has an upright 30 provided with an eye 31 for the passage of an adjusting rod, as will be hereinafter described.

The tongue C is equipped with a hound frame D which is hingedly connected with the rear portion of the carrying frame A, said tongue being also provided with means for attachment of the draft including an equalizer E and whiffletrees F. The tongue also supports adjacent to its rear end a platform 32 with which is connected a swiveled yoke 33 having a ground-engaging wheel or caster 34 and an upwardly extending stem 35 with a steering lever or handle 36. The driver's seat 37 is likewise supported upon the platform 32, and the tongue adjacent to said platform and in front of the driver's seat carries a lever stand G including a plurality of segment racks or quadrants 38 to coöperate with the various adjusting levers which are fulcrumed in proper relation thereto, as will presently appear.

Levers 39, 40 are fulcrumed adjacent to one side of the tongue, and the levers 41, 42 are fulcrumed adjacent to the other side of the tongue, each of said levers being equipped with a stop member 43 adapted to engage one of the racks 38 of the lever stand. The lever 39 is connected with one end of a rod 44, the other end of which extends through the eye 31 of the upright 30 rising from the rake head, said rod having a terminal button or stop member 45 between which and the upright 30 is located a coiled spring 46 exerting pressure against the upright of the rake head to counteract the pressure exerted by the hay against the gathering teeth 29. It will be seen that by manipulating the lever 39, the rake may be tilted to various positions including that indicated in dotted lines in Fig. 2, where the rake teeth are indicated as being completely lifted above the ground to what might be termed a discharging or non-engaging position which is assumed while the machine is being turned or transported. The rake head as has been hereinbefore described is slidably supported in slots 26, said rake head being preferably provided with terminal trunnions 25', seen in Fig. 2 and in dotted lines in Fig. 7, for the purpose of enabling it to be conveniently tilted. To provide for the longitudinal adjustment of the rake head, a rock shaft 47 is supported for oscillation in the frame, said rock shaft being provided adjacent to the ends thereof with arms 48 which are connected by links 49 with uprights 50 rising from the rake head adjacent to the ends of the latter. The rock shaft 47 has an arm 51 which is connected by a link 52 with the lever 40, whereby the rock shaft may be oscillated for the purpose of sliding the rake head longitudinally in its bearings. A second rock shaft 53 supported adjacent to the rock shaft 47 is provided with an upwardly extending arm 54 which is connected by a link 55 with the lever 41, whereby said rock shaft may be oscillated. The rock shaft 53 is provided adjacent to the ends thereof with arms or cranks 56 which are connected by chains 57' with the lower end of the carrier frame B which may thus be raised from the ground when desired for the purpose of turning or transporting the machine, or for other reasons. The main carrying frame A is provided adjacent to its front end with brackets 57 connected by a truss bar 58 and a rod 59 between which a strut 60 is interposed.

Extending upwardly from the rear end of the carrying frame are rods 61 connected adjacent to their upper ends by a movable plate 62 which is adjustably secured by means of nuts 63 which serve to regulate the tension of springs 64 which are coiled upon the rods between the plate 62 and a stationary plate 65. An auxiliary upright 66 extends from the frame A to the plate 65, said uprights 61 and 66 serving to space apart the connecting links 44, 52 and 55 hereinbefore mentioned, as will be clearly seen in Fig. 6 of the drawings. A plate or washer 67, which is bent to form a keeper 68 slides vertically upon the uprights or rods 61 between the springs 64 and the plate 65, and an adjusting arm or bar 69 which is pivoted upon the rod 59 extends rearwardly through the keeper and is subject to the tension of the springs 64. The bar 69 extends rearwardly within reach of the driver and is equipped with a spring catch 70 embracing a lever or upright 71 which is pivoted upon the tongue and which is provided with notches 72 adapted to be engaged by the spring catch for the purpose of retaining the adjusting bar 69 at various adjustments. It will be seen that by means of the bar 69 the carrying frame may be tilted to various positions with reference to the axle, thus raising or lowering the front end of the frame, as may be deemed necessary and desirable. The springs 64 engaging the adjusting bar 69 will permit the carrying frame to yield resiliently so as to support the load carried at the front end of said frame. Supported adjacent to the front end of the carrying frame transversely of the latter is a carrier box or trough 73 adjacent to one end of which an extension trough 74 is hingedly supported. An endless carrier is provided, the same consisting of a belt or apron 75 which is guided over rollers 76, 77 adjacent to the ends of the trough 73 and the extension 74, respectively, said rollers being preferably mounted in adjustable boxes or bearings in order that slack may be taken up when necessary. The endless apron 75 is provided with slats 78, the ends of which are guided beneath flanges 79 upon the side walls of the trough 73 and extend throughout the length of said trough, thus maintaining the endless apron in engagement with the bottom of the trough until the extension 74 is reached, said extension being usually supported in an upwardly inclined position for the purpose of discharging material passing over the carrier into a wagon box or receptacle. A yoke 80 which is suitably connected with the carrying frame A is provided with an arm 81 having an eye 82 for the purpose of guiding a flexible supporting member 83, one end of which is attached to said eye, said supporting element being guided through an eye 84 formed upon a yoke 85 connected with the extension member 74, and thence back through the eye 82 and to a point of attachment, such as a cross bar 86.

The guide roller 77 adjacent to the outer end of the extension member 74 has a shaft 87 carrying a sprocket wheel 88 which is connected by a chain 89 with a sprocket wheel 90 upon a shaft 91 which is supported for rotation in suitable bearings upon one side of the carrying frame A. Supported slidably upon the shaft 91 is a clutch member 92 adapted to engage a corresponding clutch member 93 formed upon a pinion 94 which is mounted for rotation upon the shaft 91 with which the clutch member 92 is connected for rotation by means of a key or spline 95. The slidable clutch member 92 is engaged by a collar 96 and one end of a suitably guided link or rod 97, the other end of which is connected with one arm of a lever 98 which is fulcrumed upon the carrying frame A and the opposite end of which is connected by a link 99 with the adjusting lever 42 by means of which the clutch member 92 may thus be manipulated or placed into or out of engagement with the clutch member of the pinion 94. The latter meshes with a gear wheel 100 which is securely mounted upon the axle of the machine. It will be readily seen that by throwing the clutch member 92 into or out of gear the transmission of motion to the endless carrier including the belt or apron 75 may be effected or broken at the will of the operator. The rear edge of the carrier trough 73 is provided with a plurality of teeth 101 extending forwardly, as shown, and said teeth being arranged in a continuous row, the individual teeth of which vary in length, said teeth decreasing in length toward the end of the trough 73 with which the extension member 74 is connected. These teeth receive the material discharged over the elevating carrier including the apron 15, and they serve to distribute such material evenly upon the carrier apron 75 over the entire width of the latter. It is obvious that the teeth 101 must be supported at a suitable elevation above the carrier belt or apron 75 so as not to interfere with the slats of said carrier.

From the foregoing description, taken in connection with the drawings hereto annexed, the operation and advantages of this invention will be readily understood. When the machine is propelled over the field the hay will be gathered by the rake teeth from which it is swept by the toothed slats 20 of the elevating carrier, being thereby carried upwardly and forwardly and discharged over the teeth 101 upon the apron 75 of the conveyer, whereby it is discharged into the wagon or other receptacle driven alongside of the machine. The various adjusting means will enable the rake to be longitudinally moved with reference to the elevating carrier, and the rake may be tilted to a non-engaging or discharging position, as shown. When the machine is in active operation, the rake is supported resiliently owing to the presence of the spring 46, whereby the points of the rake teeth are forced in the direction of the elevating carrier. The lower or receiving end of said carrier may be elevated from the ground when desired, and the main carrier frame may be readily tilted so as to raise or lower the discharging conveyer. The latter may be conveniently thrown into or out of gear by means of the clutch actuated by the lever 42. The general construction is simple, and the device will be found to be thoroughly efficient for the purpose for which it is provided.

Having thus described the invention, what is claimed as new, is:—

1. A wheel carrying axle, a main frame tiltably connected therewith, a carrier frame hingedly connected with the main frame, an endless carrier carried upon said carrier frame, longitudinally slotted brackets connected with the main frame, a rake head having trunnions engaging the slotted brackets to support the rake head for longitudinally slidable movement with reference to the main frame, said rake head being provided with teeth curved in the direction of the lower end of the carrier frame, means for adjusting the rake head and for retaining it at various adjustments, and means for vertically adjusting the lower end of the carrier frame.

2. A wheel carrying axle, a main frame tiltably supported thereon, a carrier frame hingedly connected with the main frame, an endless carrier carried upon said carrier frame, a rake head, means supporting said rake head for oscillation and for longitudinally slidable movement with reference to the main frame, said rake head being equipped with teeth curved in the direction of the lower end of the carrier frame, means for rocking the rake head, and means for effecting longitudinal adjustment of the latter.

3. A wheel carrying axle, a main frame tiltably supported thereon, a carrier frame hingedly connected with the main frame, an endless carrier movable upon said carrier frame, a rake including a head having trunnions upon which it may be rocked, brackets connected with the main frame and having longitudinal slots wherein the trunnions are supported, means for effecting longitudinal adjustment of the rake head along the slotted brackets, and means for rocking the rake including an apertured arm extending upwardly from the rake head, a push rod extending therethrough, and a spring engaging the arm to resiliently support the rake with the teeth thereof in working position.

4. A wheel carrying axle, a main frame tiltably supported thereon, a carrier frame hingedly connected with the main frame, an endless carrier movable upon said frame, a gathering rake comprising a head supported for oscillation and for longitudinal movement with reference to the main frame and teeth extending therefrom in the direction of the receiving end of the endless carrier, supporting means for the rake head, means for effecting longitudinal adjustment of the rake head and for rocking the same including means for resiliently forcing the rake teeth in the direction of the carrier, means for transmitting motion from the axle to the endless carrier, a conveyer supported transversely adjacent to the discharge end of the endless carrier, said conveyer including a hingedly supported adjustable extension member, and means including a clutch for transmitting motion from the axle of the machine to said conveyer.

5. In a machine of the character described, a wheel carrying axle, a tiltably supported main frame, a carrier hingedly connected with the main frame, means for adjusting and supporting the carrier at various inclinations with reference to the main frame, an adjustably supported rake having teeth directed toward the receiving end of the carrier, means for supporting said rake, a conveyer supported transversely adjacent to the discharge end of the carrier and including an endless slatted apron, and a series of distributing teeth connected with the transversely disposed conveyer and projecting over the endless apron of the same, said teeth being of different length gradually decreasing in the direction of the discharge end of the conveyer.

In testimony whereof I affix my signature in presence of two witnesses.

WILLARD A. SMITH.

Witnesses:
E. C. BONNER,
A. LANED.

---

Copies of this patent may be obtained for five cents each, by addressing the "Commissioner of Patents, Washington, D. C."